United States Patent
Bock et al.

(10) Patent No.: US 12,043,343 B2
(45) Date of Patent: Jul. 23, 2024

(54) LOCKING DEVICE FOR LOCKING AN ENERGY SUPPLY UNIT TO A BICYCLE

(71) Applicant: Brose Antriebstechnik GmbH & Co. Kommanditgesellschaft, Berlin, Berlin (DE)

(72) Inventors: Michael Bock, Berlin (DE); Markus Heinz, Berlin (DE)

(73) Assignee: Brose Antriebstechnik GmbH & Co. Kommanditgesellschaft, Berlin (DE)

( * ) Notice: Subject to any disclaimer, the term of this patent is extended or adjusted under 35 U.S.C. 154(b) by 329 days.

(21) Appl. No.: 17/599,176

(22) PCT Filed: Mar. 23, 2020

(86) PCT No.: PCT/EP2020/057929
§ 371 (c)(1),
(2) Date: Nov. 30, 2021

(87) PCT Pub. No.: WO2020/200865
PCT Pub. Date: Oct. 8, 2020

(65) Prior Publication Data
US 2022/0161891 A1 May 26, 2022

(30) Foreign Application Priority Data
Apr. 1, 2019 (DE) ...................... 10 2019 204 572.3

(51) Int. Cl.
*B60K 1/04* (2019.01)
*B62J 43/13* (2020.01)
(Continued)

(52) U.S. Cl.
CPC .................. *B62M 6/90* (2013.01); *B60K 1/04* (2013.01); *B62J 43/13* (2020.02); *B62J 43/28* (2020.02);
(Continued)

(58) Field of Classification Search
CPC .... B62M 6/90; B60K 1/04; B60K 2001/0405; B62J 43/13; B62J 43/28; H01M 50/249;
(Continued)

(56) References Cited

U.S. PATENT DOCUMENTS 7,393,125 B1 * 7/2008 Lai .......................... B62M 6/80
   280/281.1
8,979,110 B2 * 3/2015 Talavasek ................ B62M 6/60
   280/279

(Continued)

FOREIGN PATENT DOCUMENTS

CN 201538223 U 8/2010
DE 202013004427 U1 6/2013
(Continued)

OTHER PUBLICATIONS

Notice of Opposition With Google English Machine Translation for EP 20714969.1, Dated Dec. 12, 2023, All together 70 Pages.

*Primary Examiner* — Jacob B Meyer
(74) *Attorney, Agent, or Firm* — Dickinson Wright PLLC

(57) ABSTRACT

A locking device for locking an energy supply unit of a bicycle including a holding element. The locking device configured to lock the energy supply unit to the holding element in a locking position, and for separation of the energy supply unit from the holding element, to permit movement of the energy supply unit from the locking position to an intermediate position, and to release the energy supply unit, disposed in the intermediate position, when the energy supply unit is to be separated from the holding element. The locking device includes a guide element adjustable between a clamping position, in which a clamping force is applied along a clamping direction to the energy supply unit, and a release position, in which movement of the energy supply unit from the locking position into (Continued)

the intermediate position along a direction of movement extending at an angle to the clamping direction.

20 Claims, 6 Drawing Sheets

(51) Int. Cl.
 *B62J 43/28* (2020.01)
 *B62M 6/90* (2010.01)
 *H01M 50/249* (2021.01)
 *H01M 50/262* (2021.01)
(52) U.S. Cl.
 CPC ....... *H01M 50/249* (2021.01); *H01M 50/262* (2021.01); *B60K 2001/0405* (2013.01); *B60Y 2200/13* (2013.01); *H01M 2220/20* (2013.01)
(58) Field of Classification Search
 CPC ............ H01M 50/262; H01M 2220/20; B60Y 2200/13
 See application file for complete search history.

(56) References Cited

U.S. PATENT DOCUMENTS

| | | | |
|---|---|---|---|
| 8,979,111 B2 * | 3/2015 | Dal Pozzo | B62J 50/225 180/68.5 |
| 9,611,003 B1 * | 4/2017 | Yu | B62M 6/90 |
| 9,676,443 B2 * | 6/2017 | Perkins | B62K 19/36 |
| 10,137,954 B2 * | 11/2018 | Hendey | B62M 6/90 |
| 10,336,398 B2 * | 7/2019 | Hudec | B62K 25/04 |
| 10,343,747 B2 * | 7/2019 | Cunado Landa | B62M 6/90 |
| 10,518,841 B2 * | 12/2019 | Talavasek | B62K 19/18 |
| 10,850,805 B1 * | 12/2020 | Noda | B62K 19/34 |
| 10,906,610 B2 * | 2/2021 | Talavasek | B62J 43/13 |
| 11,021,212 B2 * | 6/2021 | Shimoda | B62J 43/28 |
| 11,077,767 B2 * | 8/2021 | Reimer | B60L 50/20 |
| 11,124,259 B2 * | 9/2021 | Talavasek | B62J 43/13 |
| 11,161,567 B2 * | 11/2021 | Eguchi | B62K 19/40 |
| 11,177,531 B2 * | 11/2021 | Kinnich | H01M 50/244 |
| 11,208,170 B2 * | 12/2021 | Matsuura Frontini | B62K 3/06 |
| 11,299,238 B2 * | 4/2022 | Yang | B62M 6/90 |
| 11,325,678 B2 * | 5/2022 | Wecker | B62K 19/40 |
| 11,370,319 B2 * | 6/2022 | Treadway | B60L 53/80 |
| 11,396,346 B2 * | 7/2022 | De La Serna Gonzalez | B62J 11/19 |
| 11,469,474 B2 * | 10/2022 | Liu | H01M 50/262 |
| 11,621,454 B2 * | 4/2023 | Liu | B62J 43/13 429/163 |
| 2016/0311494 A1 * | 10/2016 | Schliewert | B62K 19/30 |
| 2016/0375954 A1 * | 12/2016 | Talavasek | B62M 9/00 180/220 |
| 2016/0375956 A1 * | 12/2016 | Talavasek | B62K 11/04 180/220 |
| 2017/0073042 A1 * | 3/2017 | Evensen | B62M 6/90 |
| 2017/0174095 A1 * | 6/2017 | Shieh | B62M 6/40 |
| 2017/0190243 A1 * | 7/2017 | Duan | B62M 6/90 |
| 2018/0001785 A1 * | 1/2018 | Shimoda | B62J 43/28 |
| 2018/0006277 A1 * | 1/2018 | Shimoda | B62M 6/90 |
| 2018/0006278 A1 * | 1/2018 | Shimoda | H01M 50/202 |
| 2018/0072379 A1 * | 3/2018 | Talavasek | B62J 43/13 |
| 2018/0072380 A1 * | 3/2018 | Talavasek | B62K 25/28 |
| 2018/0241022 A1 * | 8/2018 | Nishihara | B60L 50/64 |
| 2018/0269439 A1 * | 9/2018 | Yoneda | B62M 6/90 |
| 2019/0097194 A1 | 3/2019 | Hirsch et al. | |
| 2019/0165347 A1 * | 5/2019 | Trif | B62M 6/90 |
| 2019/0229307 A1 * | 7/2019 | Mitsuyasu | H01M 50/213 |
| 2019/0329660 A1 * | 10/2019 | Shieh | B62M 6/90 |
| 2019/0337587 A1 * | 11/2019 | den Hertog | H01M 50/262 |
| 2019/0337588 A1 * | 11/2019 | Wecker | B62K 19/40 |
| 2021/0016850 A1 * | 1/2021 | Bass | E05B 67/006 |
| 2021/0265607 A1 * | 8/2021 | Bosscher | H01M 50/24 |
| 2022/0161891 A1 * | 5/2022 | Bock | B62M 6/90 |
| 2023/0030226 A1 * | 2/2023 | Morozumi | B60K 1/04 |

FOREIGN PATENT DOCUMENTS

| | | | | |
|---|---|---|---|---|
| DE | 202015003010 U1 | 6/2015 | | |
| DE | 202016104156 U1 | 9/2016 | | |
| DE | 102016213903 B3 | 1/2018 | | |
| DE | 102017005434 A1 | 1/2018 | | |
| DE | 102018006690 A1 | 2/2019 | | |
| DE | 102017216841 A1 | 3/2019 | | |
| DE | 102020213036 A1 * | 4/2022 | ............ | B62H 5/001 |
| DE | 102021104614 A1 * | 9/2022 | | |
| EP | 2230164 A1 | 9/2010 | | |
| FR | 2741585 A1 | 5/1997 | | |
| FR | 3126393 A1 * | 3/2023 | | |
| JP | 3204600 U | 6/2016 | | |
| WO | WO-2020200865 A1 * | 10/2020 | ............ | B60K 1/04 |
| WO | WO-2022078973 A1 * | 4/2022 | | |
| WO | WO-2022179844 A1 * | 9/2022 | ............ | B62H 5/001 |

* cited by examiner

LOCKING DEVICE FOR LOCKING AN ENERGY SUPPLY UNIT TO A BICYCLE

CROSS-REFERENCE TO RELATED APPLICATIONS

This application is the U.S. National Phase of PCT Application No. PCT/EP2020/057929 filed on Mar. 23, 2020, which claims priority to German Patent Application No. DE 10 2019 204 572.3, filed on Apr. 1, 2019, the disclosures of which are hereby incorporated in their entirety by reference herein.

TECHNICAL FIELD

The present disclosure relates to a locking device for locking an energy supply unit of a bicycle.

BACKGROUND

Locking devices for locking an energy supply unit, for example comprising an accumulator (battery), are widely known in connection with bicycles. As an example in connection with electric bicycles, especially so-called pedelecs, an energy supply unit is needed to supply one or more electric motors of the bicycle for the drive of the bicycle supported by an electric motor. The energy supply unit then for example is to be fixed to a holding element of the bicycle frame as part of the locking device, but can be removed when the locking device is opened, for example in order to charge a battery of the energy supply unit.

Typically, energy supply units for electric bicycles comprising a battery are secured to a down tube as holding element via a lock of a locking device. To prevent the energy supply unit from falling out or falling off the bicycle frame when the lock is unlocked, a two-stage unlocking mechanism then is frequently provided. The locking device is equipped to lock the energy supply unit in a locking position not only to the holding element, but to also permit a movement of the energy supply unit from the locking position into an intermediate position, in which the energy supply unit continues to be retained at the holding element via at least one locking element of the locking device, in order to separate the energy supply unit from the holding element, and to release the energy supply unit located in the intermediate position, when the energy supply unit actually is to be separated from the holding element.

SUMMARY

Against this background, one or more objects underlying the proposed solution is to provide a locking device which is improved over known locking devices described below.

According to one or more embodiments, a locking device is provided, the locking device may include a two-stage unlocking mechanism for an energy supply unit, which includes a guide element adjustable between a clamping position and a release position. In the clamping position, a clamping force may be applied to the energy supply unit acting located in a locking position via this guide element along a clamping direction. In the clamping position, the guide element thus is equipped and provided to apply a clamping force to the energy supply unit located in the locking position and to directly or indirectly exert this clamping force on the energy supply unit. Furthermore, with an adjustment from its clamping position into a release position the guide element provides for a movement of the energy supply unit from the locking position into an intermediate position in which the energy supply unit continues to be retained at the holding element by means of at least one locking element of the locking device. The movement of the energy supply unit made possible by the guide element with the adjustment into the release position here is effected along a direction of movement extending at an angle to the tensioning direction.

By means of the guide element, a clamping force thus may be exerted on the energy supply unit in order to clamp the energy supply unit to the holding element in the locking position and hence fix the same to the holding element in a way secured (more strongly) against relative movements. Consequently, when the energy supply unit is locked to the holding element and the guide element thereby is adjusted into its clamping position, a clamping force is applied to the energy supply unit via the guide element. Via the adjustability of the guide element between the clamping position and the release position, however, a two-stage unlocking mechanism nevertheless is provided so that the energy supply unit may be moved into the intermediate position only with the adjustment of the guide element in its release position, from which intermediate position the energy supply unit in turn may be separated from the holding element only by an additional action of the user. This additional action of the user may lead for example to the adjustment of the locking element of the locking device and/or to the adjustment of a counterpart at the energy supply unit, which cooperates with the locking element. The locking element for example is part of a lock of the locking device.

The tensioning direction and the direction of movement may extend at an angle greater than 20° to each other. For example, via the guide element disposed in its clamping position a clamping force may be applied along a clamping direction which extends substantially parallel to a direction of longitudinal extension, along which the energy supply unit extends in its locking position. The direction of movement along which the energy supply unit may move, for example by action of gravity or by a manually applied force of a user, from the locking position into the intermediate position, then for example extends substantially transversely to the direction of longitudinal extension of the energy supply unit. For example, the direction of movement on a bicycle then extends towards the ground, when the energy supply unit here is to be removable from a down tube of the bicycle frame in downward direction.

In one design variant, the guide element is adjustable between its clamping position and its release position via a slotted link guide. Hence, there is provided at least one connecting link guide that specifies the adjustment path for an adjustment of the guide element between the clamping position and the release position. For example, a portion of the guide element is retained on a guide link that specifies the adjustment path of the guide element for the adjustment between the clamping position and the release position.

As an example, the release position of the guide element may be specified by a stop element (possibly provided on a bicycle frame and hence firmly mounted to the frame), beyond which the guide element is not adjustable further into a first adjustment direction. Rather, proceeding from the stop element the guide element then may at best be adjusted back in the direction of the clamping position along a second, opposite adjustment direction.

The guide link for the guide element for example may be formed on a slotted link component that may be fixed to the energy supply unit. For example, a slotted link component of the locking device may be non-rotatably fixed on a front side of the energy supply unit. Thus, the slotted link component for example is a separate component of the locking device, which is fixed to the energy supply unit, for example via at least one screw connection. In one design variant, the slotted link component is designed as a cap that is fixed on a front side of an energy supply unit including a battery and forms a guide link for cooperation with the guide element of the locking device.

For (pre-) clamping the energy supply unit in the locking position, the guide link may include for example a ramp-like guide surface via which the clamping force acting on the energy supply unit may be generated, when a portion of the guide element is guided along the guide surface. When the guide element is adjusted into the clamping position, the guide element which is guided along the guide surface ascending in a ramp-like manner and cannot be moved perpendicularly to the guide surface, then urges the slotted link component including the guide surface (and connected to the energy supply unit or formed thereon) in the clamping direction. For example, a portion of the guide element retained on the guide link is supported on the ramp-like guide surface when the guide element is adjusted between its clamping position and its release position. Via the adjusting movement of the guide element adjusted in the direction of its clamping position, the clamping force thus is exerted on the energy supply unit. For example in the case of an adjustably mounted guide element, a pivotal movement of the guide element in the direction of its clamping position therefore involves the generation of a clamping force acting on the energy supply unit, as a portion of the guide element is guided along the guide surface of the guide link ascending in a ramp-like manner.

In one design variant, the guide link has an L-shaped design. Slotted link portions of the guide link extending at an angle to each other are associated for example to the release position on the one hand and to the clamping position on the other hand. In other words, the guide element with a portion retained on the guide link is disposed either in the one or in the other slotted link portion, depending on whether the guide element is in its clamping position or in its release position.

In one design variant, the guide link defines a guide channel into which the portion of the guide element retained on the guide link engages and which includes an end region open in a direction of longitudinal extension of the guide channel at which the portion of the guide element may be introduced into the guide link. Via the open end region of the guide channel, the portion of the guide element may thus be brought into engagement with the guide channel and hence with the guide link, when the energy supply unit is attached to the holding element and is moved, such as swiveled, in the direction of its locking position. Furthermore, the open end region also allows to bring the portion of the guide element, which is retained on the guide link when the energy supply unit is fixed to the holding element, out of engagement with the guide link and to withdraw the guide link provided on the energy supply unit from the guide element when the energy supply unit is separated from the holding element.

On the guide element, an actuating element may be provided, which is provided for introducing an adjusting force into the guide element for the adjustment of the guide element between the clamping position and the release position. For example, a manually applied adjusting force may be introduced into the guide element via the actuating element so that a user may adjust the guide element between the clamping position and the release position and hence lock and pretension the energy supply unit or, vice versa, release the same for removal.

In this connection it may also be provided for example that the actuating element is adjustably, such as pivotally mounted on the guide element. The actuating element may be adjustable for example between a position of use and a position of non-use. As an example, it may be provided that in its position of non-use the actuating element additionally acts as a barrier for a movement of the energy supply unit in the direction of movement. In the position of non-use, the actuating element then for example at least partly extends along the energy supply unit located in the locking position so that a portion of the actuating element lies in the direction of movement as seen from the energy supply unit and hence counteracts a movement of the energy supply unit in the direction of movement. In a position of use of the actuating element, the actuating element then for example provides a grip area for the hand of a user in order to adjust the actuating element and hence the guide element by introducing a manually applied adjusting force. For example, the actuating element therefor forms an actuating lever with a grip area.

In one design variant, an actuating element pivotally mounted on the guide element may be adjustable only in the clamping position of the guide element between its position of use and its position of non-use, and may be pivotable and hence suitable for folding out and folding in between its position of use and its position of non-use. Thus, in a release position of the guide element, the actuating element for example is blocked against pivoting into a position of non-use. The operating safety for the user may be increased thereby, as the actuating element cannot be folded in unless the guide element thereby has not previously been pivoted back into the clamping position.

In one design variant, the guide element is pretensioned in the direction of its release position via at least one spring element. Thus, via the at least one spring element an actuating element provided on the guide element for example is also pretensioned into a corresponding (opening) position. Via the pretension applied by means of the at least one spring element it is ensured for example that a portion of the guide element held in a guide link is disposed on that slotted link portion of the guide link which may be shifted along the guide element when the energy supply unit including the guide link is separated from the holding element. Hence, when the guide element has been adjusted into the release position with the aid of the at least one spring element, the guide element remains in this release position so that the energy supply unit is not prevented by the guide element from being separated from the holding element. Rather, a guide link provided for example on the front side of the energy supply unit may then be shifted along the guide element when a movement of the energy supply unit out of the intermediate position is enabled via the locking device.

In accordance with the proposed solution there is also provided a bicycle frame for a bicycle, such as an electric bicycle, which includes an exemplary embodiment of a proposed locking device and an energy supply unit that is fixed to a holding element of the bicycle frame.

In addition, there is provided an electric bicycle comprising a design variant of a proposed locking device.

BRIEF DESCRIPTION OF THE DRAWINGS

The attached Figures by way of example illustrate possible design variants of the proposed solution.

In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known locking device is described, for example, in DE 20 2016 104 156 U1. The locking device proposed here comprises a lock by means of which an energy supply unit comprising a battery can be locked in a locking position. When the lock is opened, the energy supply units can be swiveled up to an intermediate position, wherein the energy supply unit is prevented from folding out completely by means of a locking element in the form of a resiliently mounted locking bolt. Only by adjusting the locking element can the energy supply unit then be removed completely. To separate the energy supply unit from the frame-side holding element, for example in the form of a down tube, a user hence must actuate both the lock and the locking element, whereby a two-stage unlocking mechanism is provided.

However, previously known locking devices for energy supply units for bicycles and such as electric bicycles frequently do not permit a satisfactory fixation of the energy supply unit in the locking position, for example when it is a sporty model of bicycle, especially a mountain bike. For example, especially in the field of mountain bikes it is to be ensured during a so-called downhill ride that the energy supply unit does not become undesirably detached from the holding element or cause rattling noises, even if the bicycle frame in part has to absorb hard impacts and the energy supply unit is exposed to strong acceleration forces. For such applications, complex locking devices have been used so far, which sufficiently securely fix the energy supply unit to the holding element, but regularly do not permit a particularly user-friendly removal of the energy supply unit from a frame-side holding element.

Figure 7:
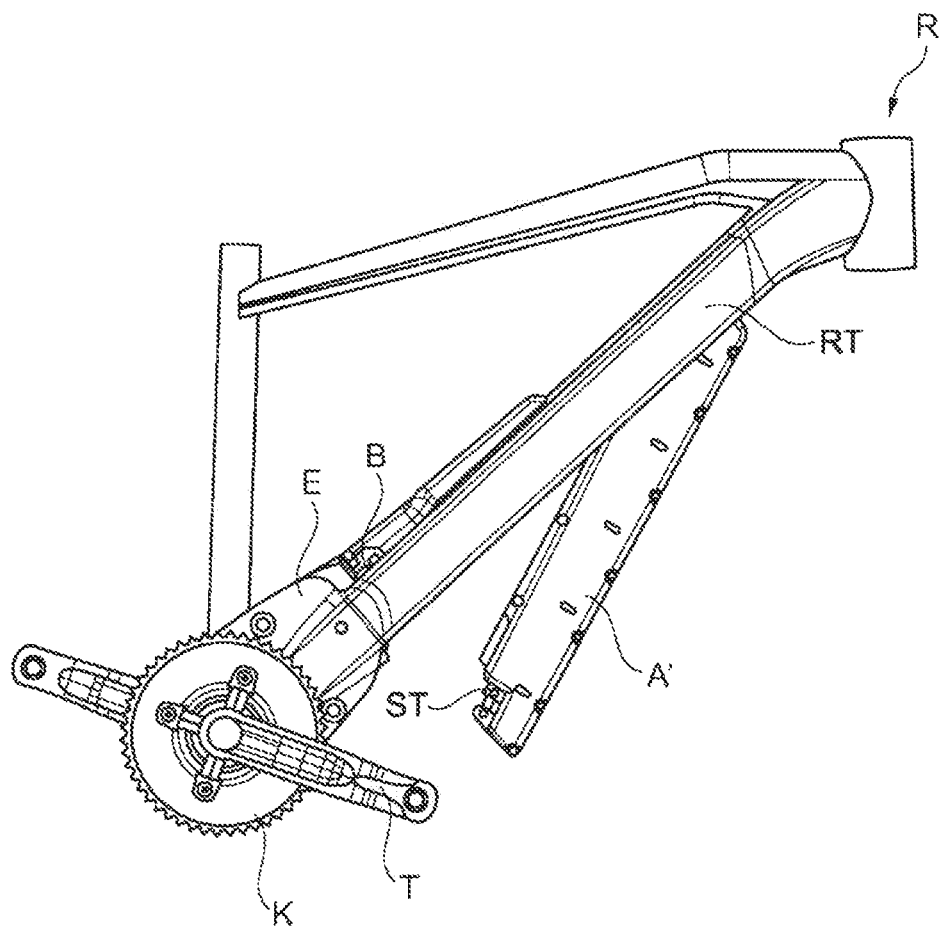
FIG. 7 shows a side view of a prior art bicycle frame, which includes a holding element in the form of a down tube with a battery fastened thereto, which in FIG. 7 is shown in a removal position already separated from a locking device.

FIG. 7 shows a design of a bicycle frame R for an electric bicycle, which is known from the prior art. The bicycle frame R includes a plurality of interconnected frame tubes, such as a holding element in the form of a down tube RT. As an example, a housing of an electric motor E is fixed to this down tube RT. There is a chain ring K coupled to this electric motor E, which in addition can also be driven via a bottom bracket crank T.

For supplying the electric motor E with electric energy, there is provided an energy supply unit A' comprising a battery. The battery possibly along with further electronic components is accommodated within a housing of the energy supply unit A'. In the following, the energy supply unit A' is equated with the battery for the sake of simplicity.

In the present case, the battery A' is attached to the down tube RT. The longitudinally extended battery A' can be pushed or inserted into a receptacle of the down tube RT at an end of the down tube RT facing away from the electric motor E. Via the end of the battery A' pushed in or inserted, the front end of the battery A' then can be folded into the receptacle formed on the underside of the tube RT. At the end of the battery A' to be folded in, a battery-side connector in the form of a connector plug ST is provided. This battery-side connector ST is plugged to a motor-side connector provided within the receptacle of the down tube RT, when the battery A' is completely folded into the receptacle of the down tube RT and accommodated therein, as intended.

To release the battery A' from the down tube RT, an operating handle B is provided on the upper side of the down tube RT. When this operating handle B is actuated, a locking device integrally mounted on the down tube RT releases the battery A' so that the same can be folded out and be removed by a user in downward direction, i.e. towards the ground.

In a locking device known from the prior art, as it is employed in a bicycle frame R of FIG. 7, the battery A' must be held with one hand when the operating handle B is actuated, in order to prevent the battery A' from falling out of the down tube RT. This considerably reduces the operating comfort when removing the battery A'. Moreover, the illustrated construction is only partially suitable for electric bicycles that expressly are provided for rides in which the bicycle frame R is subjected to significant shocks, such as for example in so-called downhill rides with mountain bikes.

In this respect the proposed solution provides a remedy, a design variant of which is illustrated in detail in FIGS. 1 to 6.

The proposed solution provides a locking device 1 via which a two-stage unlocking mechanism for the removal of an energy supply unit including a battery A is implemented on an electric bicycle. In the variant shown in FIGS. 1 to 6, the battery A is pivotally mounted on a lower area of the down tube RT, i.e. on an area close to the chain ring. In an upper area of the down tube RT there is provided the locking device 1 comprising a lock unit 1a, in order to lock the battery A properly folded into a receptacle of the down tube RT in place at the down tube RT. Via the lock unit 1a, the battery A is secured in place at the down tube RT and cannot be separated from the down tube RT without inserting and rotating an appropriate key 10a.

Figure 1:
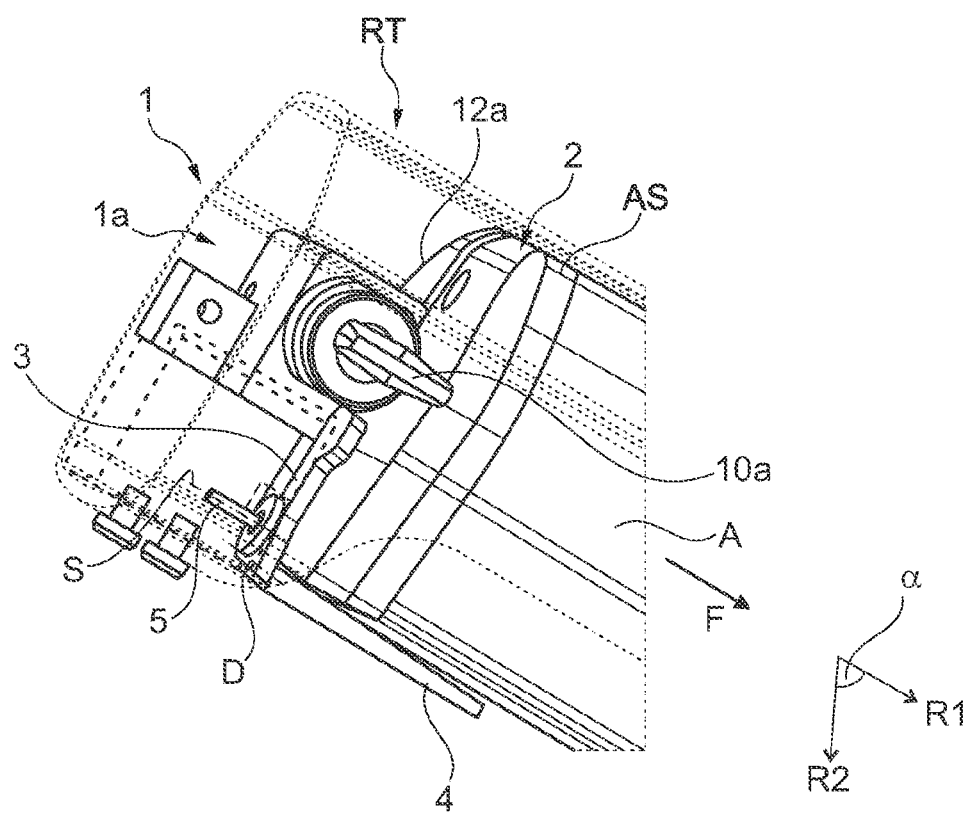
FIG. 1 sectionally and in a perspective view shows an exemplary embodiment of a proposed locking device comprising an energy supply unit having an accumulator (battery) in a locking position on a holding element in the form of a down tube of a bicycle frame.

In a locking position of the battery A as shown in FIG. 1, a pre-tensioning force F is applied to the battery A along the clamping direction R1 pointing in the direction of longitudinal extension of the battery A. This pre-tensioning force F is applied to the battery A in the longitudinal direction so that the battery A is held securely clamped to the down tube RT. This allows movements of the battery A to be greatly limited or even completely inhibited, even in the event of hard impacts on the bicycle frame R.

The pre-tensioning force F is achieved via the cooperation of a guide element 3 of the locking device 1 with a slotted link component in the form of a battery cap 2 of the locking device 1. The cooperation of the guide element 3 and the battery cap 2 furthermore also ensures two-stage unlocking of the battery A when the same is to be removed from the down tube RT. The battery cap 2 constitutes a separate component and is non-rotatably fixed to a front side AS of the battery A. For fixation to the front side AS of the battery A, a plurality of fastening points in the form of fastening holes 21a to 21d for fastening screws are formed on the battery cap 2 (cf. such as FIGS. 5 and 6).

As can be taken from the synopsis of FIGS. 1 to 6 and FIGS. 3A to 3C, the guide element 3 designed in the manner of an L-shaped lever is mounted on a bearing part 11 of the locking device 1 firmly mounted to the down tube so as to be pivotable about a pivot axis S via a bearing element in the form of a bearing screw 5. The guide element 3 for example is disposed completely within the down tube RT. The guide element 3 is pivotally mounted on the bearing screw 5 via a guide portion 32. On a guide portion 32 spaced apart from the bearing portion 34 a guide pin 320 is formed on the guide element 3, which is shiftably held in a guide link 20 of the battery cap 2, such as when the battery A is disposed in its locking position on the down tube RT.

Figure 6:
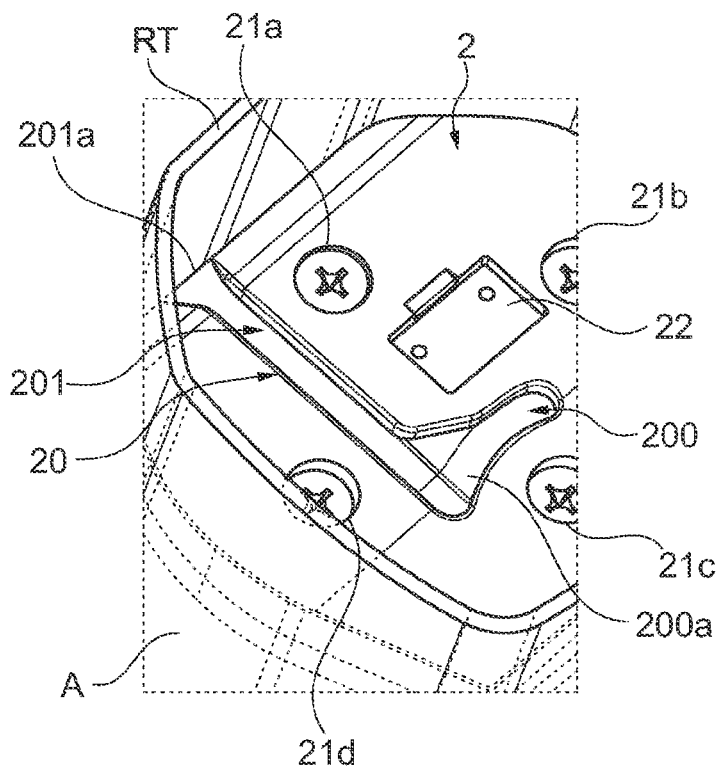
FIG. 6 shows a top view of the battery cap in its stated fixed to the energy supply unit.

In the present case, the guide link 20 of the battery cap 2 is of L-shaped design and beside a longitudinally extended (second) slotted link portion 201 with an outwardly open end region 201a includes another shorter (first) slotted link portion 200 angled therefrom with a ramp-like guide surface 200a (cf. such as FIG. 6). The two slotted link portions 200 and 201 of the guide link 20 define an L-shaped guide channel in which the guide pin 320 of the guide element 3 can be shiftably guided.

Figure 2A:
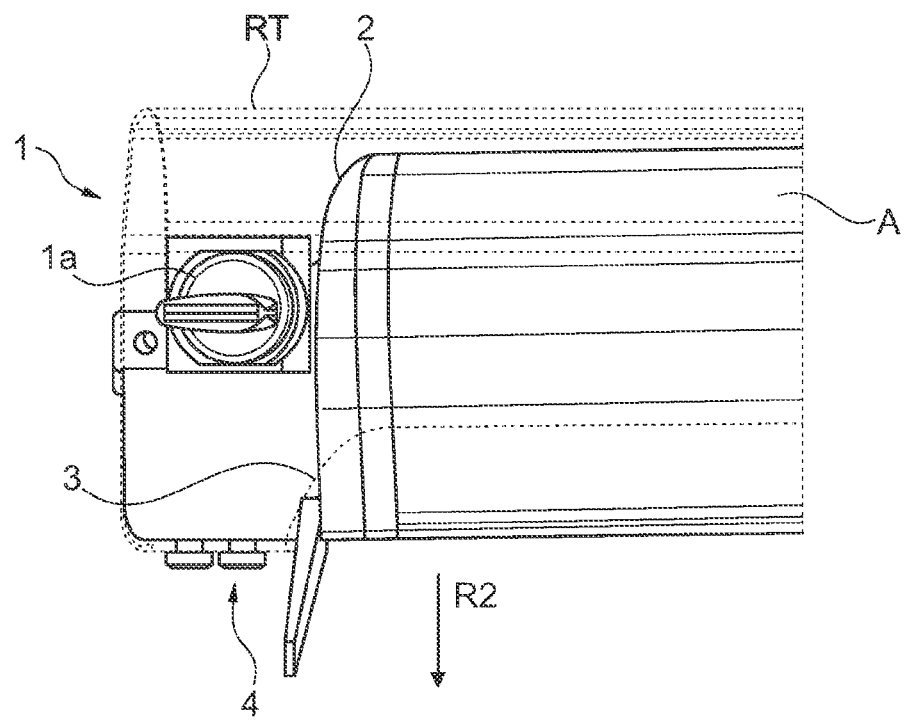
FIGS. 2A-2B in various views show the locking device of FIG. 1 comprising a guide element in a release position and the energy supply unit in an intermediate position.
Figure 2B:
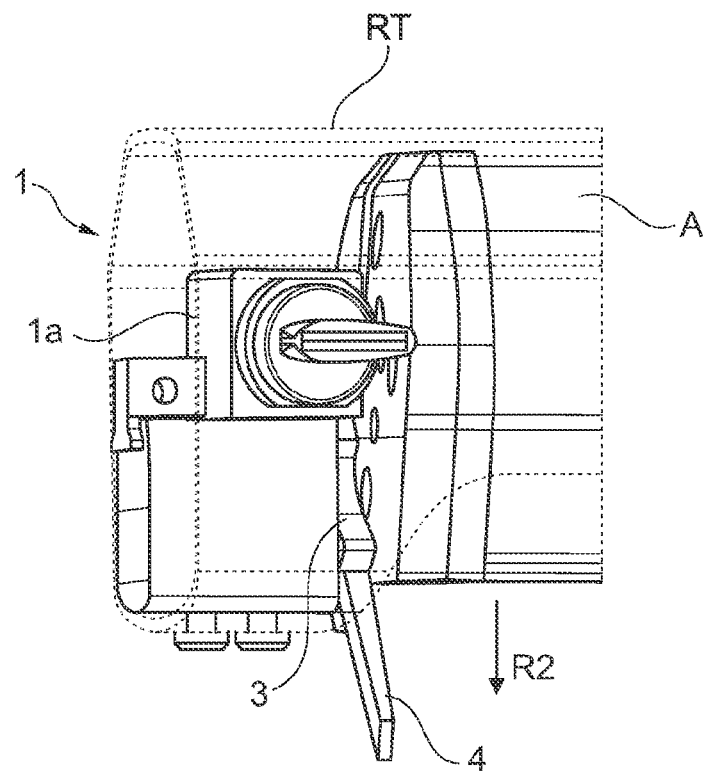
Figure 3A:
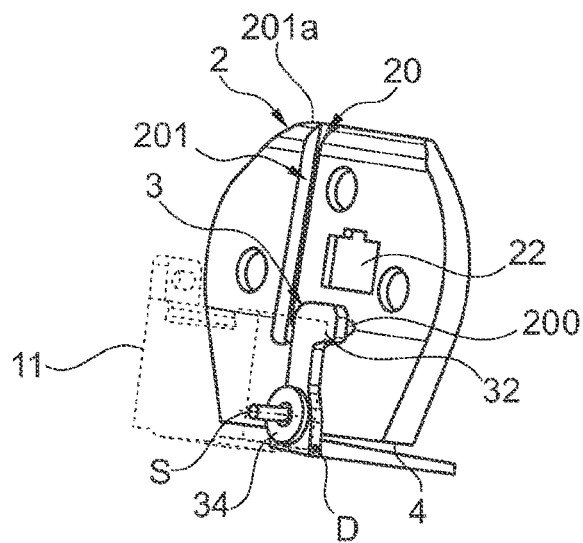
FIGS. 3A-3C in individual representations show the locking device without the down tube and with a slotted link component configured as a battery cap, which is to be fixed to the energy supply unit, in different phases of an adjustment of the guide element proceeding from a clamping position of FIG. 3A to a release position of FIG. 3C.
Figure 3B:
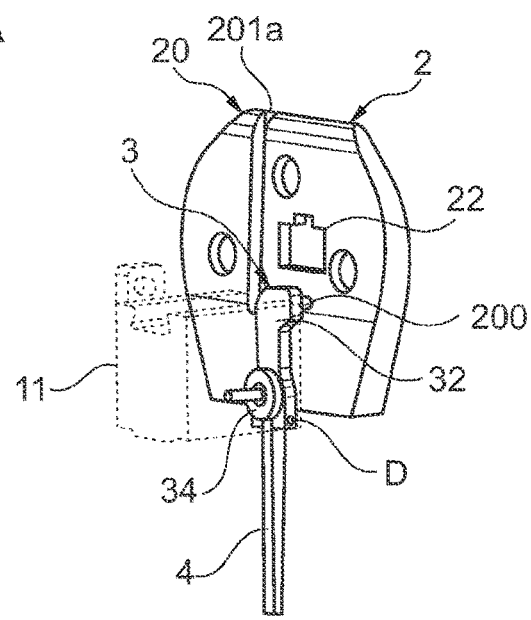
Figure 3C:
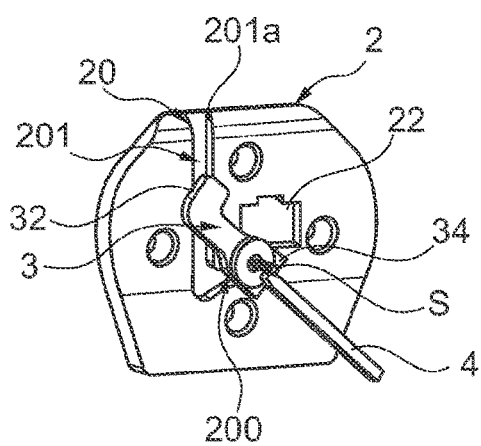
Figure 4A:
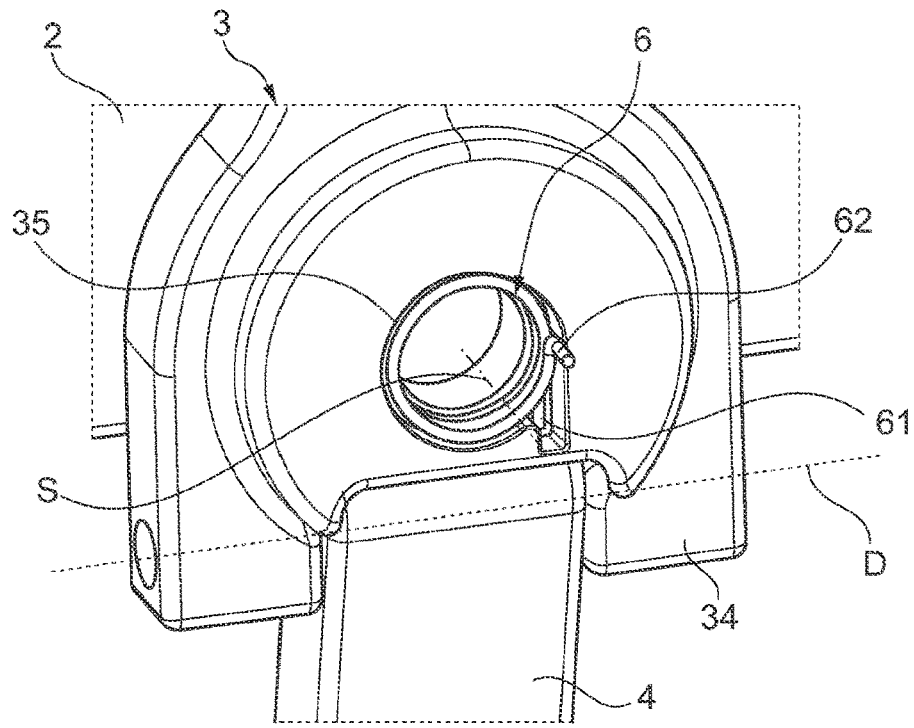
FIG. 4A on an enlarged scale shows the guide element with a view onto a spring element for pre-tensioning the guide element into its release position and onto a bearing portion of the guide element, to which an actuating element in the form of an actuating lever is articulated.
Figure 4B:
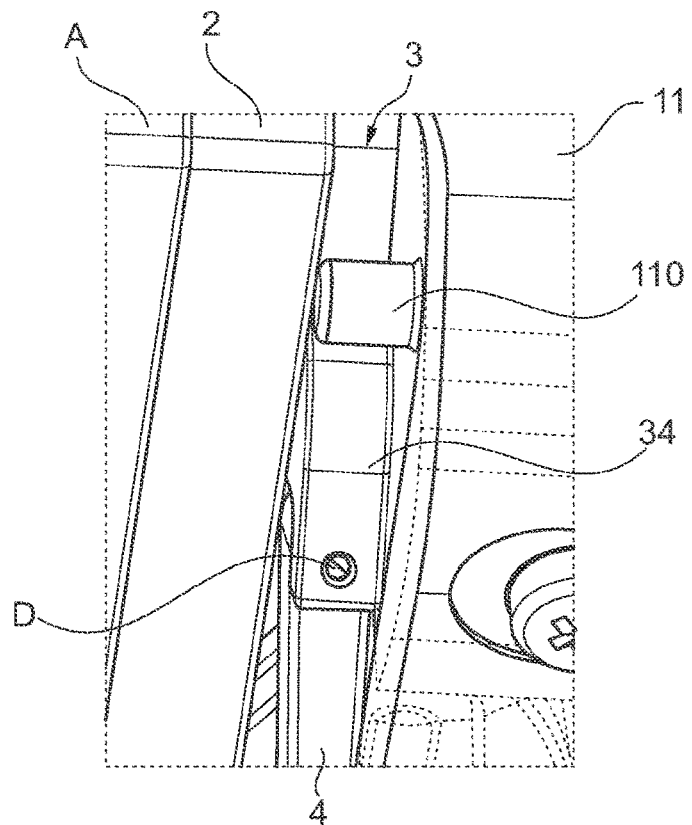
FIG. 4B on an enlarged scale and in a side view shows the guide element in its release position, in which it rests against a stop element of the locking device.
Figure 5:
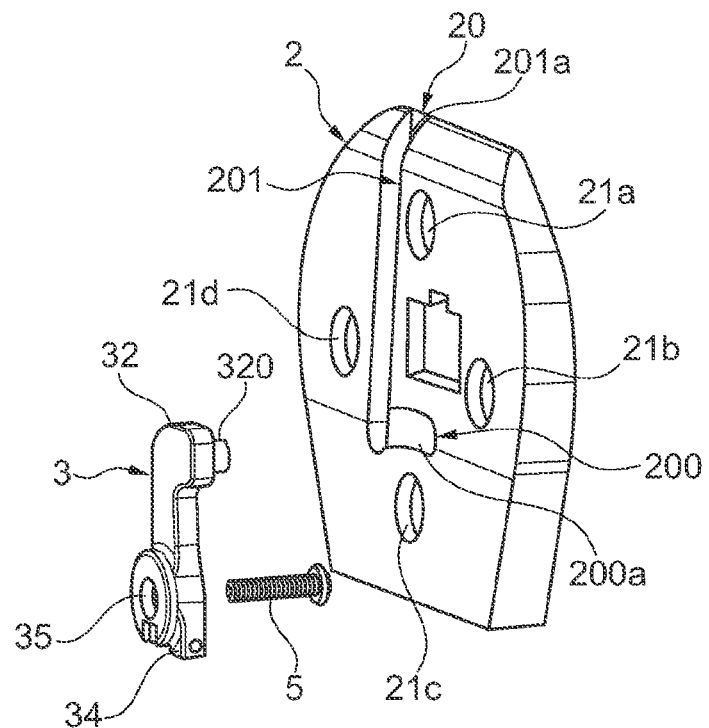
FIG. 5 shows an exploded representation of the guide element and the battery cap of the locking device together with a bearing element for the pivotable mounting of the guide element.

In the locking position of the battery A, the guide pin 320 rests against an end of the guide surface 200a of the slotted link portion 200 protruding most on the front side, and thereby urges the battery A into the clamping direction R1 and loads the battery A with the pre-tensioning force F. When the guide element 3 is pivoted out of this defined clamping position by rotation about the pivot axis S along the guide link 20 into a release position as shown in FIG. 3C, the guide pin 320 slides along the guide surface 200a in the direction of the other slotted link portion 201. By guiding the guide pin 320 along the guide surface 200 then descending in a ramp-like manner, the pre-tensioning force F decreases. By moving the guide pin 320 in the direction of the other, second slotted link portion 201, pivoting of the battery A by a few degrees, for example by 1°, along a direction of movement R2 on the front side AS facing the locking device 1 into an intermediate position, which is shown in FIGS. 2A and 2B, is permitted.

The direction of movement R2 here extends at an angle α to the clamping direction R1 extending parallel to the direction of longitudinal extension of the battery A and is specified for example by the force of gravity acting on the battery A, when the locking device 1 is properly mounted on a bicycle frame R of an electric bicycle.

To be able to pivot the guide element 3 more easily about its pivot axis S, an actuating element in the form of an actuating lever 4 is articulated to the bearing portion 34 of the guide element 3. The bearing portion 34 here defines a lever pivot axis D about which the actuating lever 4 is pivotally mounted on the guide element 3. In the present case, the lever pivot axis D by way of example extends perpendicularly to the pivot axis S of the guide element 3. In the clamping position of the guide element 3 and the resulting locking position of the battery A, the actuating lever 4 can be folded in on an underside of the down tube RT so that the actuating lever 4 provides an additional barrier and hence protection of the battery A against undesired folding out.

To transfer the guide element 3 from its clamping position into the release position, the actuating lever 4 is pivoted about its lever pivot axis D corresponding to FIG. 3B so that the actuating lever 4 provides a grip area for a user, which protrudes below the down tube RT. By pushing or pulling the actuating lever 4, the guide element 3 can then be pivoted about its pivot axis S from the clamping position into the release position. During this adjustment, the guide pin 320 on the battery-side guide link 20 is shifted along the ramp-like guide surface 200a into the second slotted link portion 201, until the guide element 3 abuts against a bearing-part-side stop element in the form of a stop pin 110 and hence a further pivotal movement of the guide element 3 about the pivot axis S is prevented.

Via a spring element in the form of a leg spring 6, the guide element 3 is pretensioned in the direction of its release position. Hence, when an adjusting force is introduced via the actuating lever 4 in order to adjust the guide element 3 in the direction of its release position, the leg spring 6 maintains the guide element 3 in the release position and hence holds the actuating lever 4 connected thereto in a corresponding open position in which the guide element 3 rests against the stop pin 110. The leg spring 6 therefor is supported on the guide element 3 via a first spring end 61 and on the bearing part 11 via a second spring end 62 so that the leg spring 6 is pretensioned in the direction of the release position about the pivot axis S. The leg spring 6 is arranged in the vicinity of a pivot bearing opening 35 of the guide portion 32 of the guide element 3, through which the bearing screw 5 extends and which is defined by the pivot bearing for the pivotability of the guide element 3 about the pivot axis S.

The adjustment of the guide element 3 into its release position provides for a movement of the battery A into the intermediate position in which the battery A on the front side, however, continues to be retained at the down tube RT via a locking element 12a of the lock unit 1a of the locking device 1. The locking element 12a can be formed for example by a locking bolt, locking pin or locking block. On the battery cap 2 a corresponding lock cutout 22 is provided, into which the respective locking element 12a can positively engage in order to retain the battery in an intermediate position A on the down tube RT as long as the lock unit 1a has not been actuated.

Since the guide link 20 forms an open end region 201a on the second slotted link portion 201, on which the guide pin 320 of the guide element 3 is disposed in the release position, the battery A can be withdrawn from the guide element 3 when the lock unit 1a is actuated by rotating the key 10a in the intermediate position of the battery A, and the battery A then is folded out in downward direction (or depending on the orientation of the receptacle on the down tube RT folded out laterally or towards the top) and is to be separated from the down tube RT.

When the battery A is attached to the down tube RT, the battery A initially can be held in the intermediate position by means of the lock unit 1a of the locking device 1. For this purpose, the locking element 12a for example is elastically pretensioned in the direction of a locking state so that the battery A can simply be plugged to the down tube RT and be swiveled in. When the battery A is swiveled in, the guide link 20 is brought into engagement with the guide pin 320 of the guide element 3 via the end region 201a of the second slotted link portion 201 and is shifted along the same. Subsequently, the guide element 3 is pivoted about its pivot axis S by engagement with the actuating lever 4 folded out, in order to adjust the guide element 3 from its release position corresponding with the intermediate position of the battery A in the direction of its clamping position. During this pivotal movement, the guide pin 320 slides in the guide link 20 and gets out of the second slotted link portion 201 into the first slotted link portion 200 including the ramp-like guide surface 200a. The guide pin 320 then is supported on the guide surface 200a ascending in a ramp-like manner (in this adjustment direction) and slides along the same. Via the guide element 3, a pre-tensioning force F acting in the longitudinal direction and hence in the clamping direction R1 thereby is applied to the battery A. Via the L-shaped extension of the guide eye 20, the battery A furthermore is transferred from the intermediate position into the pretensioned locking position. When the battery A is disposed in this defined locking position, the actuating lever 4 can be folded in about the lever pivot axis D in the direction of the battery A.

Consequently, the adjustment path defined by the guide link 20 on the one hand provides the possibility of the two-stage unlocking of the battery A and on the other hand permits pre-tensioning of the battery A in its locking position, whereby a comparatively stable fixation of the battery A on the down tube RT is ensured.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 locking device
1a lock unit
10a key
11 bearing part
110 stop pin (stop element)
12a locking element
2 battery cap (slotted link component)
20 guide link
200,201 slotted link portion
200a guide surface
201a end region
21a-21d fastening hole/fastening point
22 lock cutout
3 guide element
32 guide portion
320 guide pin
34 bearing portion
35 pivot bearing opening
4 actuating lever (actuating element)
5 bearing screw (bearing element)
6 torsion spring (spring element)
61, 62 spring end
A, A' battery (energy supply unit)
AS end face
B operating handle
D lever pivot axis
E electric motor
F pre-tensioning force
K chain ring
R bicycle frame
R1 clamping direction
R2 direction of movement
RT down tube (holding element)
S pivot axis
ST connector plug
T pedal crank
α angle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A locking device for locking an energy supply unit of a bicycle, the locking device comprising:
    a holding element; and
    a locking unit configured to,
        lock the energy supply unit to the holding element when the energy supply is in a locking position, and
        permit separation of the energy supply unit from the holding element, so that the energy supply unit may move from the locking position to an intermediate position,
    wherein the locking unit includes a locking element configured to,
        hold the energy supply unit to the holding element when the energy supply unit is moved from the locking position, and
        release the energy supply unit, disposed in the intermediate position, to permit separation of the energy supply unit from the holding element,
    wherein the locking unit includes a guide element adjustable between a clamping position and a release position, wherein in the clamping position, a clamping force is permitted to be applied in a clamping direction to the energy supply unit when the energy supply unit is disposed in the locking position and wherein adjustment of the guide element from the clamping position to the release position permits the energy supply unit to move from the locking position to the intermediate position along a direction of movement, wherein the direction of movement extends at an angle with respect to the clamping direction.

2. The locking device of claim 1, wherein when the energy supply unit is in the locking position, a direction of longitudinal extension of the energy supply unit extends substantially parallel to the clamping direction.

3. The locking device of claim 1, wherein the guide element is configured to move along a guide link between the clamping position and the release position.

4. The locking device of claim 3, wherein a portion of the guide element is retained by the guide link, and the guide link forms an adjustment path of the guide element between the clamping position and the release position.

5. The locking device of claim 4, wherein the guide link is formed by a slotted link component configured to be fixed on the energy supply unit.

6. The locking device of claim 5, wherein the guide link includes a ramp-like guide surface configured to generate the clamping force applied to the energy supply unit as the portion of the guide element is guided along the ramp-like guide surface.

7. The locking device of claim 4, wherein the guide link is L-shaped.

8. The locking device of any of claims 4 to 7, wherein the guide link defines a guide channel configured to receive the portion, wherein the guide channel includes an end region, the end region includes an opening open in a direction of longitudinal extension of the guide channel and configured to receive the portion of the guide element as the portion is inserted into the guide link.

9. The locking device of claim 1, further comprising:
an actuating element disposed on the guide element configured to apply an adjusting force to the guide element to adjust the guide element between the clamping position and the release position.

10. The locking device of claim 9, wherein the actuating element is adjustable with respect to the guide element.

11. The locking device of claim 1, further comprising:
a spring element configured to bias the guide element in a direction towards the release position.

12. The locking device of claim 9, wherein the actuating element is pivotally mounted to the guide element.

13. A locking assembly configured to provide a two-stage locking action to secure a battery to a bicycle frame, the locking assembly comprising:
a bearing part configured to be fixed to a portion of the bicycle frame;
a lock plate configured to be fixed to the battery and defining a slot and a cutout;
a lock unit including a locking element configured to move between an unlocked state and a locked state, in which portions of the locking element is disposed in the cutout to provide a first locking stage; and
a guide element configured to be inserted into the slot and movable between an unlocked state and a locked state, in which guide element clamps the lock plate to the bicycle frame to provide a second locking stage.

14. The locking assembly of claim 13, further comprising:
a lever pivotally mounted to the guide element and configured to pivot between a release position, in which guide element is in the unlocked state, and a locked position, in which the guide element is in the locked state.

15. The locking assembly of claim 13, wherein the slot includes a first portion and a second portion, wherein the first portion includes a ramped surface and the guide element moves along the ramped surface to change the guide element from the unlocked state to the locked state.

16. The locking assembly of claim 13, wherein the lock unit is configured to receive a key and wherein rotation of the key moves the locking element between the unlocked state and the locked state.

17. A locking assembly configured to provide a two-stage locking action to secure a battery to a bicycle frame, the locking assembly comprising:
a bearing part configured to be fixed to a portion of the bicycle frame;
a battery cap configured to be fixed to the battery and defining a slot and a cutout;
a lock unit including a locking element configured to move between an unlocked state and a locked state, in which portions of the locking element is disposed in the cutout to provide a first locking stage;
a guide element configured to be inserted into the slot and movable between an unlocked state and a locked state, in which guide element clamps the lock plate to the bicycle frame to provide a second locking stage;
a lever pivotally mounted to the guide element and configured to pivot between a release position, in which guide element is in the unlocked state, and a locked position, in which the guide element is in the locked state; and
a spring coupled to the element and configured to bias the lever towards the release position.

18. The locking assembly of claim 17, wherein the slot includes a first portion and a second portion, wherein as the battery is attached to the bicycle frame, the second portion of the slot is configured to receive the guide element.

19. The locking assembly of claim 18, wherein the first portion is orthogonal to the second portion.

20. The locking assembly of claim 18, wherein the guide element includes a main body and a pin extending therefrom, wherein the pin is configured to move along ramped surface of the first portion of the slot.

* * * * *